United States Patent
Habu et al.

(10) Patent No.: US 10,279,809 B2
(45) Date of Patent: May 7, 2019

(54) TRAVELLED-ROUTE SELECTING APPARATUS AND METHOD

(71) Applicant: DENSO CORPORATION, Kariya, Aichi-pref. (JP)

(72) Inventors: Toshiya Habu, Kariya (JP); Takahisa Yokoyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 69 days.

(21) Appl. No.: 15/549,642

(22) PCT Filed: Feb. 10, 2016

(86) PCT No.: PCT/JP2016/054010
§ 371 (c)(1),
(2) Date: Aug. 8, 2017

(87) PCT Pub. No.: WO2016/129646
PCT Pub. Date: Aug. 18, 2016

(65) Prior Publication Data
US 2018/0022351 A1 Jan. 25, 2018

(30) Foreign Application Priority Data

Feb. 10, 2015 (JP) .................................. 2015-024523

(51) Int. Cl.
*B60W 30/165* (2012.01)
*B60W 30/12* (2006.01)
(Continued)

(52) U.S. Cl.
CPC ...... *B60W 30/165* (2013.01); *B60W 30/0956* (2013.01); *B60W 30/12* (2013.01);
(Continued)

(58) Field of Classification Search
CPC ........... B60W 30/165; B60W 30/0956; B60W 30/12; B60W 40/04; B60W 2420/42;
(Continued)

(56) References Cited

U.S. PATENT DOCUMENTS

| 6,014,607 A * | 1/2000 | Yagyu | G01C 21/3446 340/990 |
| 8,676,410 B2 * | 3/2014 | Houpt | B61L 27/0027 701/19 |
| 8,989,913 B2 * | 3/2015 | Tsunekawa | B60W 40/072 701/1 |

(Continued)

FOREIGN PATENT DOCUMENTS

| EP | 2224211 A1 * | 9/2010 | ......... G01C 21/3492 |
| JP | 2004-249761 | 9/2004 | |
| JP | 2004-322916 | 11/2004 | |
| JP | 2009-012704 A | 1/2009 | |

*Primary Examiner* — Tuan C To

(74) *Attorney, Agent, or Firm* — Knobbe, Martens, Olson & Bear, LLP

(57) ABSTRACT

A travelled-route selecting apparatus includes a first route selecting unit to select, from travelled routes of other vehicles generated by a route generating unit, one or more travelled routes. The one or more travelled routes each have a relative distance relative to an own vehicle equal to or lower than a predetermined threshold value. The travelled-route selecting apparatus includes a second route selecting unit to select, from the travelled routes selected by the first route selecting unit, a travelled route corresponding to a selected other vehicle. The selected other vehicle is the closest to the own vehicle among the other vehicles corresponding to the travelled routes selected by the first route selecting unit.

20 Claims, 8 Drawing Sheets

(51) Int. Cl.
- *B60W 40/04* (2006.01)
- *B60W 30/095* (2012.01)
- *G08G 1/16* (2006.01)

(52) U.S. Cl.
CPC ............ *B60W 40/04* (2013.01); *G08G 1/166* (2013.01); *B60W 2420/42* (2013.01); *B60W 2420/52* (2013.01); *B60W 2550/302* (2013.01); *B60W 2550/306* (2013.01); *B60W 2550/308* (2013.01); *B60W 2750/302* (2013.01); *B60W 2750/306* (2013.01); *B60W 2750/308* (2013.01)

(58) Field of Classification Search
CPC ....... B60W 2420/52; B60W 2550/302; B60W 2550/306; B60W 2550/308; B60W 2750/302; B60W 2750/306; B60W 2750/308; G08G 1/166
See application file for complete search history.

(56) References Cited

U.S. PATENT DOCUMENTS

| | | | | |
|---|---|---|---|---|
| 9,157,761 | B2* | 10/2015 | Levin | G01C 21/3697 |
| 9,239,243 | B2* | 1/2016 | Engelhardt | G01C 21/32 |
| 9,609,046 | B2* | 3/2017 | Fowe | G01C 21/26 |
| 9,718,469 | B2* | 8/2017 | Matsubara | G08G 1/165 |
| 9,824,505 | B2* | 11/2017 | Tseng | G07C 5/00 |
| 9,829,332 | B2* | 11/2017 | Hilbrandie | G01C 21/32 |
| 9,975,558 | B2* | 5/2018 | Altendorfer | B60W 40/04 |
| 2006/0036363 | A1* | 2/2006 | Crook | G01C 21/3461 |
| 2008/0033643 | A1* | 2/2008 | Shimizu | G01C 21/3461 |
| 2010/0004840 | A1* | 1/2010 | Klotz | B60W 30/16 701/96 |
| 2010/0191436 | A1* | 7/2010 | Hellmann | B60W 30/146 701/96 |
| 2014/0046581 | A1* | 2/2014 | Ota | G08G 1/096716 701/408 |
| 2014/0180569 | A1 | 6/2014 | Ueda et al. | |

* cited by examiner

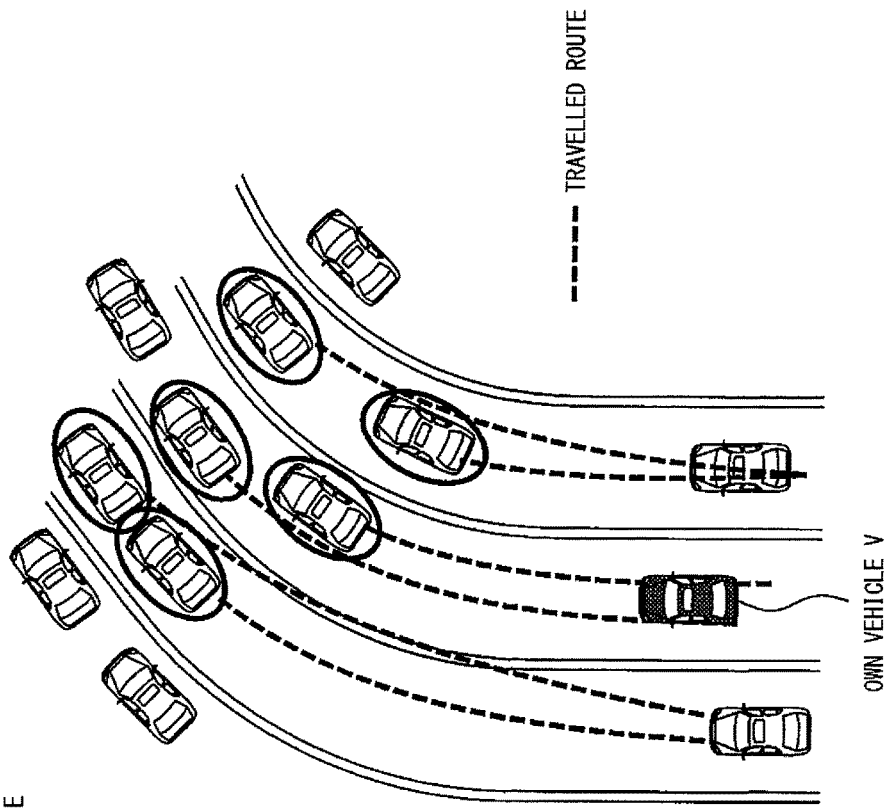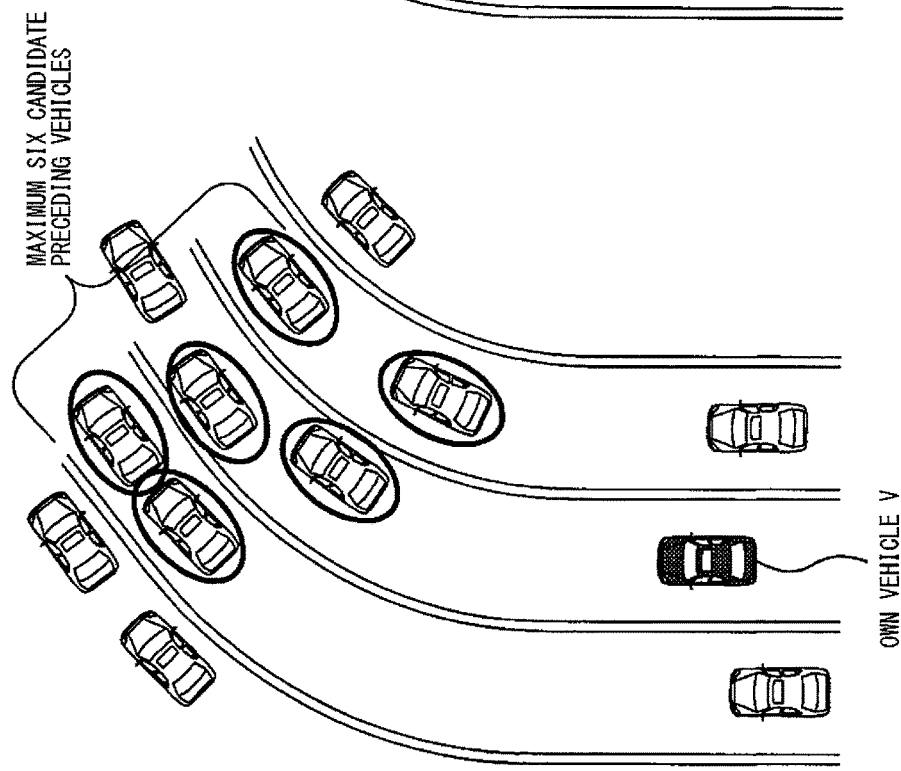

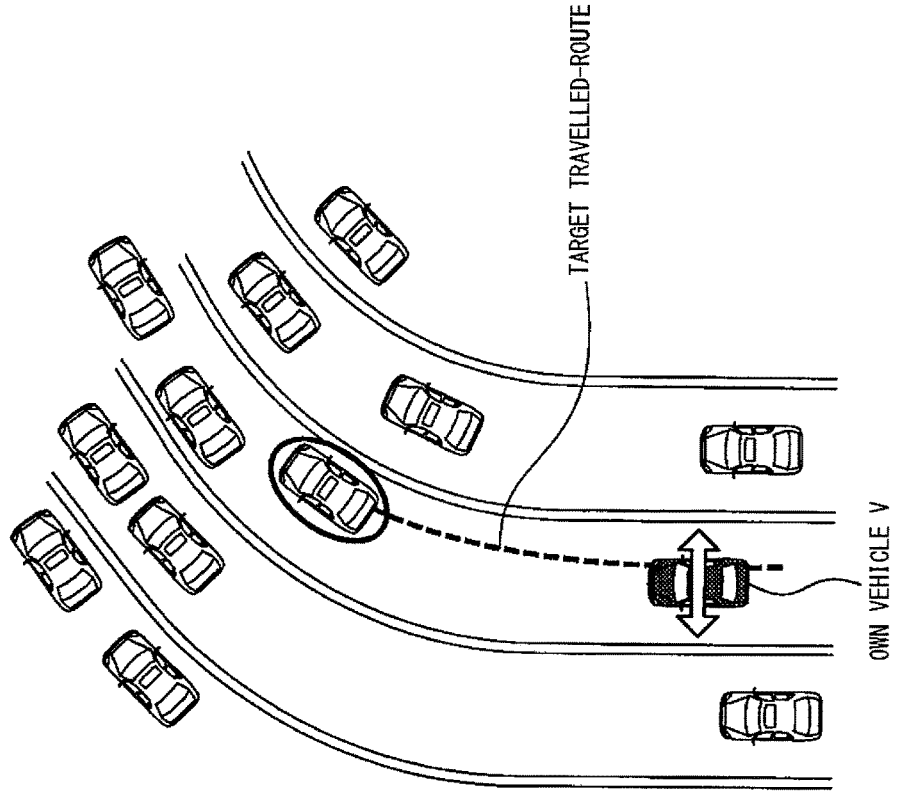
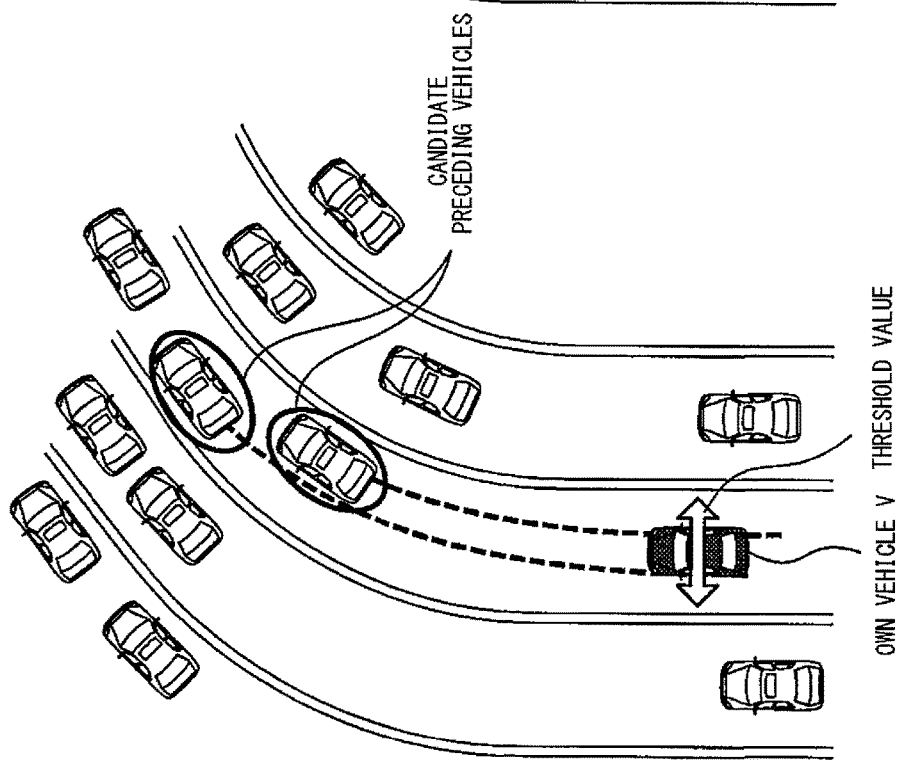

TRAVELLED-ROUTE SELECTING APPARATUS AND METHOD

TECHNICAL FIELD

The present invention relates to technologies for selecting, as a travelled route used to control an own vehicle, one of travelled routes of other vehicles travelling in front of the own vehicle.

BACKGROUND ART

A known technology determines another vehicle as a tracking target of an own vehicle using a cruising assist system, such as adaptive cruising control (ACC). For example, this technology estimates a travelling route of the own vehicle based on outputs of a yaw rate sensor and a vehicle speed sensor, and determines, as the tracking target, a vehicle detected on the estimated travelling route as the tracking target (see patent document 1.

CITATION LIST

Patent Document

[Patent Document 1] Japanese Patent Application Publication No. 2009-12704

SUMMARY OF INVENTION

Technical Problem

The above proposed technology determines, as the tracking target, a vehicle using the estimated travelling route of the own vehicle.

For example, let us assume that there is a curve ahead on a road including a travelling lane of the own vehicle and an adjacent lane. In this assumption, when a preceding vehicle, which is travelling on the same lane as the own vehicle, is travelling on the curve, the preceding vehicle may be deviated from the estimated travelling route of the own vehicle (see FIG. 7 described later). In this case, if an adjacent vehicle, which is travelling on the adjacent lane, enters the estimated travelling route of the own vehicle, the technology may erroneously select the adjacent vehicle as the tracking target although the preceding vehicle is present on the same travelling lane.

From the above circumstances, the present invention provides technologies that select a travelling route of another vehicle in front of an own vehicle. Using this technology to control the own vehicle, i.e. to determine a tracking-target vehicle of the own vehicle, enables the tracking-target vehicle to be determined with higher accuracy.

Means for Solving Problem

A travelled-route selecting apparatus according to a first aspect of the present invention includes an other vehicle detecting unit, a route generating unit, a first route selecting unit, and a second route selecting unit. The other vehicle detecting unit detects other vehicles in front of an own vehicle, and the route generating unit generates a travelled route of each of the other vehicles detected by the other vehicle detecting unit.

The first route selecting unit selects, from the travelled routes of the other vehicles generated by the route generating unit, one or more travelled routes. The one or more travelled routes each have a relative distance relative to the own vehicle equal to or lower than a predetermined threshold value. The second route selecting unit selects, from the travelled routes selected by the first route selecting unit, a travelled route corresponding one selected other vehicle. The selected other vehicle is the closest to the own vehicle among the other vehicles corresponding to the travelled routes selected by the first route selecting unit.

A travelled-route selecting method according to a second aspect of the present invention includes a first step, a second step, a third step, and a fourth step. The first step detects other vehicles in front of an own vehicle, and the second step generates a travelled route of each of the other vehicles detected by the third step. The third step selects, from the travelled routes of the other vehicles generated by the second step, one or more travelled routes. The one or more travelled routes each have a relative distance relative to the own vehicle equal to or lower than a predetermined threshold value. The fourth step selects, from the travelled routes selected by the third step, a travelled route corresponding to a selected other vehicle, the selected other vehicle being the closest to the own vehicle among the other vehicles corresponding to the travelled routes selected by the third step.

A driving assist system according to a third aspect of the present invention includes the travelled-route selecting apparatus according to the first aspect, and a driving assist apparatus configured to perform driving assist of the own vehicle in accordance with the travelled route selected by the second route selecting means of the travelled-route selecting apparatus.

Each of the first to third aspects selects, from the travelled routes of the other vehicles, referred to as forward vehicles, in front of the own vehicle, one or more travelled routes. The one or more travelled routes each have the relative distance relative to the own vehicle equal to or lower than the predetermined threshold value. This reduces erroneous selection of a travelled route of an adjacent vehicle or a cutting-in vehicle.

When the travelled routes are selected, a travelled route of one of the forward vehicles is selected; the selected forward vehicle is the closest to the own vehicle among the forward vehicles. This enables the travelled route of the forward vehicle whose behavior is similar to the behavior of the own vehicle to be selected. This therefore increases the probability that travelled routes of vehicles, such as a cutting-in vehicle, whose behaviors are different from the behavior of the own vehicle, are eliminated from selection candidates.

Note that bracketed reference numerals in the claims represent correspondence relationship with respect to specific means described in the following embodiments as an example, and therefore do not restrict the scope of the present invention.

BRIEF DESCRIPTION OF DRAWINGS

FIG. 4A is a view illustrating candidate preceding vehicles according to the first embodiment.

FIG. 4B is a view illustrating candidate travelled-routes according to the first embodiment.

FIG. 5A is a view complementarily describing step S130 of the travelled-route selecting task according to the first embodiment.

FIG. 5B is a view complementarily describing step S140 of the travelled-route selecting task according to the first embodiment.

DESCRIPTION OF EMBODIMENT

The following describes the embodiments of the present invention with reference to the accompanying drawings.

First Embodiment 1-1 Structure

Figure 1:
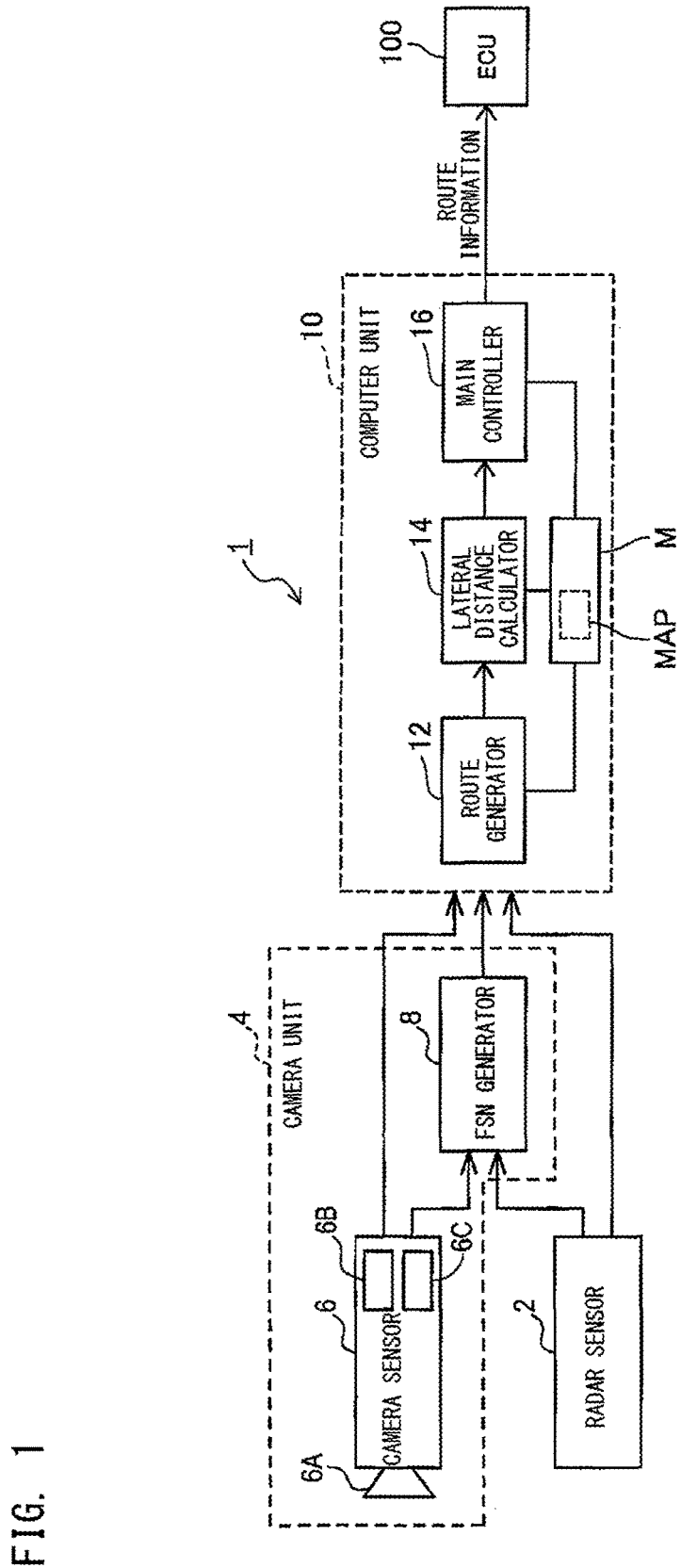
FIG. 1 is a block diagram illustrating the structure of a travelled-route selecting apparatus according to the first embodiment of the present invention.

A travelling route selecting apparatus 1 illustrated in FIG. 1 includes a radar sensor 2, a camera unit 4, and a computer unit 10.

The travelling route selecting apparatus 1, which is installed in a vehicle, i.e. an own vehicle, V, is communicably connected to at least one electronic control unit (ECU) 100 installed in the own vehicle V.

The travelling routine selecting apparatus 1 generates information associated with its travelling route as route information, and transmits the generated route information to the at least one ECU 100.

The at least one ECU 100 is configured to implement at least part of at least one function in various functions installed in an advanced driving assist system (ADAS).

Specifically, the at least one ECU 100 receives, via, for example, an in-vehicle local area network (LAN), the route information transmitted from the travelling route selecting apparatus 1 as a piece of vehicle control information. Then, the at least one ECU 100 uses the received route information as a vehicle control task for implementing the various functions of the ADAS. That is, the travelling route selecting apparatus 1 and the at least one ECU 100 constitute at least part of the ADAS.

The functions of the ADAS include, for example, full speed range adaptive cruise control (full speed range ACC) and lane trace control (LTC).

In the full speed range ACC, the at least one ECU 100 determines a preceding vehicle as its tracking target in accordance with the route information received from the travelling route selecting apparatus 1. Then, the at least one ECU 100 causes the own vehicle V to track the determined preceding vehicle over a wide vehicle-speed range from, for example, 0 km to a predetermined high speed; 0 km represents the own vehicle V being stopped.

In the LTC, the at least one ECU 100 determines an optimum target travelling line of the own vehicle V in accordance with the route information received from the travelling route selecting apparatus 1. Note that further descriptions of the full speed range ACC and LTC are omitted, because the full speed range ACC and LTC are well known.

The radar sensor 2 transmits radar waves, such as millimeter waves or ultrasonic waves, and receives echoes generated based on reflection of the transmitted radar waves by an object. The radar sensor 2 calculates, for example, the distance of the object from the own vehicle V based on, for example, time required from the transmitting of each radar wave to the receiving of the corresponding echo. The direction of each echo enables an orientation, i.e. an angle, of the object with respect to the own vehicle V. This enables the position of the object to be identified based on the calculated distance and angle.

The radar sensor 2 is mounted in, for example, the front grille of the vehicle V, and transmits radar waves in front of the vehicle V. If the radar sensor 2 scans radar waves over a predetermined angular range that extends in the right and left direction around the front direction of the vehicle V, the predetermined angular range represents an object detection range.

A millimeter radar, which is an example of the radar sensor 2, outputs transmission waves from a transmission antenna; each transmission wave is frequency modulated based on a triangular wave. The millimeter radar receives echoes generated based on reflection of the transmitted radar waves by another vehicle, such as a forward vehicle, in front of the vehicle V using receiving antennas. The millimeter radar mixes the echoes with the transmitted wave, thus obtaining beat signals.

The waveform of each beat signal changes due to interference caused by the distance to the forward vehicle and the relative speed. This enables the relative distance and the relative speed between the own vehicle V and the forward vehicle to be calculated based on the waveform of each beat signal. If a preceding is located in the direction of transmission waves, receiving echoes generated based on reflection of the transmission waves by the forward vehicle using receiving antennas enables the azimuth of the forward vehicle located in front of the own vehicle V in the horizontal direction to be detected based on the received echoes.

Specifically, the radar sensor 2 detects, as a first detection result, the relative position of a forward vehicle, which is located in front of the own vehicle V, with respect to the own vehicle V; the relative position of the forward vehicle with respect to the own vehicle V includes the distance of the forward vehicle with respect to the own vehicle V, and the azimuth of the forward vehicle with respect to the own vehicle V in the horizontal direction.

Note that receiving directions of echoes are changed depending on where the radar waves, i.e. millimeter waves, are reflected from the body of the forward vehicle. For this reason, the deviation, i.e. detection deviation, of the azimuth of the forward vehicle detected by the radar sensor 2 from the actual azimuth of the forward vehicle may be greater than the azimuth of the forward vehicle detected by the camera unit 4 described later from the actual azimuth of the forward vehicle.

The camera unit 4 includes a camera sensor 6 and an FSN generator 8. The camera unit 4 is installed in the compartment of the vehicle V to prevent the lenses of the camera sensor 6, which images the front of the own vehicle V, from being exposed to wind and/or rain. The camera unit 4 is mounted to the location that enables the driver's sight to be ensured. For example, the camera unit 4 is adhered to the upper side of the front windshield.

The camera sensor 6 includes an imaging unit 6A, a vehicle detector 6B, and a lane marking detector 6C.

The imaging unit 6A includes a known image capture device, such as a CMOS device or a CCD device, and lenses.

The imaging unit 6A has an optical axis that is directed slightly downward relative to the front direction of the own vehicle V, and also has an imaging region horizontally extending around the optical axis within a predetermined angular range. The imaging unit 6A captures images of the imaging region. That is, light, i.e. an image, from the imaging region in front of the vehicle V enters, via the lenses, the image pickup device that is comprised of pixels arranged in matrix. Each pixel of the image pickup device converts corresponding light into an electrical signal, and stores the electrical signal as electrical charge. The electrical charge stored in each pixel of the image pickup device is read out as a voltage corresponding to the corresponding electrical charge. The voltage signal read out from each pixel is amplified, and thereafter converted by an A/D conversion process into a digital signal having a predetermined light-intensity level, i.e. a predetermined gray-scale level. That is, an image of the imaging region in front of the vehicle V is converted into a frame digital image that is comprised of the pixels each having a pixel level based on the corresponding digital signal; the frame digital image will be referred to as a forward image. Such forward images, i.e. frame forward images, are captured at a predetermined frame rate. Note that two or more imaging units 6A can be provided to, for example, constitute a stereo camera. Another imaging unit 6A can be provided to pick up, for example, a rear region or a side region of the vehicle V.

The vehicle detector 6B, the lane marking detector 6C, and the FSN generator 8 are functional components implemented based on tasks by a microcomputer, which is comprised of, for example, a CPU, a memory, such as a ROM and/or RAM, and an I/O. At least part of each of the functional components 6A, 6B, and 6C can be implemented by a common microcomputer, or the functional components 6A, 6B, and 6C can be implemented by individual microcomputers communicable with each other. Each of the vehicle detector 6B and the lane marking detector 6C individually performs image processing on forward images captured by the imaging unit 6A, thus respectively detecting a forward vehicle and lane marking lines.

The vehicle detector 6B detects, from the forward image, the shape of a vehicle using one of known methods. For example, the vehicle detector 6B performs a matching task between the forward image and object models previously registered therein. The object models are respectively prepared for the types and features of objects. The types of objects include, for example, vehicle, pedestrian, bicycle, and roadside object, and the features of objects include standard-sized vehicle, big-sized vehicle, and small-sized vehicle if the object is a vehicle. The matching task enables the types and features of objects included in the forward image to be identified. The matching task also enables the detailed features, such as shapes, colors, and light intensities, of objects included in the forward image to be identified.

For example, the vehicle detector 6B obtains, based on the matching task, the position of a forward vehicle included in the forward image in the vertical direction, and obtains a focus of expansion (FOE) in the forward image. Then, the vehicle detector 6B detects, based on the position of the forward vehicle in the vertical direction and the position of the FOE, a lateral coordinate and a longitudinal coordinate of the center of the rear end of the forward vehicle in a two-dimensional plane corresponding to the road surface in the real space. The two-dimensional plane is a two-dimensional coordinate plane having (1) The origin defined by the center of the front end of the own vehicle (2) The lateral coordinate axis corresponding to the width direction of the own vehicle V (3) The longitudinal coordinate axis corresponding to the length direction of the own vehicle V The position of the lateral coordinate and the position of the longitudinal coordinate of the forward vehicle will be referred to respectively as a lateral position and a longitudinal position of the forward vehicle. The longitudinal position represents the distance from the own vehicle V to the center of the rear end of the forward vehicle.

Specifically, the vehicle detector 6B detects, as a second detection result, the relative position of the forward vehicle with respect to the own vehicle V; the relative position of the forward vehicle with respect to the own vehicle V includes the distance of the forward vehicle with respect to the own vehicle V, and the azimuth of the forward vehicle with respect to the own vehicle V in the horizontal direction.

Note that, in the vehicle detector 6B, the detection accuracy of the relative position may be reduced if the position of the rear end of the forward vehicle in the forward image is not accurately detected. For this reason, the deviation, i.e. detection deviation, of the distance of the forward vehicle detected by the vehicle detector 6B from the actual distance of the forward vehicle with respect to the own vehicle V may be greater than the detection deviation of the distance of the forward vehicle detected by the radar sensor 2 from the actual distance of the forward vehicle with respect to the own vehicle V.

The FSN generator 8 combines the first detection result obtained by the radar sensor 2 with the second detection result obtained by the vehicle detector 6B in order to compensate for the detection deviation resulting from the radar sensor 2 and the second detection deviation, which differs from the detection deviation, resulting from the vehicle detector 6B. Then, the FSN generator 8 generates fusion (FSN) information representing the combined position of the forward vehicle; the combined position of the forward vehicle shows the relative position of the forward vehicle with respect to the own vehicle V, which includes the distance and the azimuth of the forward vehicle in the horizontal direction. Note that the FSN generator 8 can be provided in the camera unit 4, the radar sensor 2, or the computer unit 10, or can be provided independently from them.

For example, when the location of the forward vehicle detected by the radar sensor 2, which includes the relative lateral position and longitudinal position of the forward vehicle with respect to the own vehicle V, and the location of the forward vehicle detected by the vehicle detector 6B, which includes the relative lateral position and longitudinal position of the forward vehicle with respect to the own vehicle V are within a predetermined error range, the FSN generator 6B identifies that data of the location of the forward vehicle detected by the radar sensor 2 and data of the location of the forward vehicle detected by the vehicle detector 6B are associated with the same forward vehicle.

Then, the FSN generator 8 calculates the lateral position and longitudinal position of the forward vehicle with respect to the own vehicle V as a function of (1) The relative distance of the forward vehicle with respect to the own vehicle V in the identified data detected by the radar sensor 2

(2) The azimuth of the forward vehicle in the horizontal direction based on the lateral position and longitudinal position of the forward vehicle with respect to the own vehicle V in the identified data detected by the vehicle detector 6B The FSN information generated set forth above is output to the computer unit 10 and the lane marking detector 6C as information having higher object's position detection accuracy as compared with first position-detection information based on the first detection result detected by the radar sensor 2 itself and second position-detection information based on the second detection result detected by the vehicle detector 6B itself. The first position-detection information based on the first detection result detected by the radar sensor 2 itself and the second position-detection information based on the second detection result detected by the vehicle detector 6B itself are also output to a route generator 12 and the lane marking detector 6C independently from the FSN information. Each of the FSN information, the first position-detection information, and the second position-detection information is configured to be output to the computer unit 10 and the lane marking detector 6C in a corresponding one of predetermined cycles.

Additionally, information indicative of the type and feature of the object identified by the vehicle detector 6B is also output from the vehicle detector 6B to the computer unit 10 and the lane marking detector 6C together with the second position-detection information. The information indicative of the type and feature of an object will be referred to as type-feature information. Because the type-feature information, except for the color and light-intensity information, can be generated by the radar sensor 2 using a known method, the type-feature information can be output from the radar sensor 2 to the computer unit 10.

The lane marking detector 6C detects, from the forward image captured by the imaging unit 6A, lane marking lines of a lane on which the own vehicle V is travelling; the lane will be referred to as an own lane. The lane marking detector 6C also identifies the location of a roadside object, such as a guardrail, based on the second position-detection information and the type-feature information.

The lane marking detector 6C identifies, based on a light intensity value of each pixel of the data of the forward image, i.e. frame image data, a region having pixels whose light intensity values are equal to or higher than a predetermined threshold. Then, the lane marking detector 6C searches through the region from the bottom side of the frame image data to the top side thereof for edges.

Because a white line has edges, i.e. high-frequency components, at both sides thereof, the lane marking detector 6C differentiates the light intensity values of the frame image data in the horizontal direction to thereby obtain peaks at both ends of a white line. This extracts, as edges, pixels, each of which has a light-intensity gradient or light-intensity differential value in the horizontal direction is greater than a predetermined value.

The lane marking detector 6C connects the extracted edges in the vertical direction of the forward image, i.e. the frame image data, to estimate white line candidates. Then, the lane marking detector 6C performs, for example, a method of matching between the characteristics, such as the width and shape, of each estimated white line candidate and the characteristics, such as the width and shape, of an actual white line. This enables white lines to be determined from the white line candidates. Note that the lane marking detector 6C performs a lane-marking determination task if lane marking lines are white lines. Even if lane marking lines have a color other than white, the lane marking detector 6C uses a method to variably set the weights for the light intensity values of the respective colors, i.e. red, green, and blue colors, of each pixel in the forward image, i.e. frame image data. This enables lane marking lines each having a color other than white, such as yellow or blue, to be determined in the same method as the determination of white lane marling lines.

The lane marking detector 6C extracts the edges of each of the determined white lines, i.e. each of the determined lane marking lines, and performs Hough transform of the extracted edges, thus obtaining model equations for the right and left lane marking lines. The model equation for each of the right and left lane marking lines shows the location of the corresponding one of the right and left lane marking lines relative to the own vehicle V, i.e. shows the recognition result of the own lane.

Coefficients of the model equation for example include various pieces of information about (1) The vanishing point of the right and left lane marking lines (2) The curvature of the road estimated based on the right and left lane marking lines (3) The yaw angle, i.e. the gradient of the longitudinal direction of the own vehicle V relative to each of the right and left lane marking lines (4) The width between the right and left lane marking lines (5) The offset of the center of the own vehicle V relative to a target travelling line that is defined as a line passing through the center of the width between the right and left lane marking lines Information representing the model equation, which will be referred to as lane marking information, is configured to be output from the lane marking detector 6C to the computer unit 10 in a predetermined cycle.

Note that the lane marking information is not limited to the locations of the actually measured lane marking lines, such as white lines.

For example, the lane marking detector 6C can estimate the location a lane marking line in accordance with the location of a roadside object, such as a guard rail, measured from the frame image data obtained by the camera unit 4. Then, the lane marking detector 6C can obtain lane marking information including the estimated location of the lane marking line. It is possible to estimate the location offset by a predetermined distance from the location of the roadside object as the location of a lane marking line closer to the roadside object. The lane marking information including this estimated location of the lane marking line is lower in accuracy than the lane marking information including the actually detected location of the corresponding lane marking line. In other words, the lane marking information including this estimated location of the lane marking line is lower in recognition level of own lane than the lane marking information including the actually detected location of the corresponding lane marking line. The lowering of the recognition level may become remarkably apparent if a roadside object is not continuously detected, i.e. is intermittently detected. For this reason, the lane marking information includes information indicative of a recognition level set during generation of the lane marking information. For example, the recognition level of the lane marking information generated based on the actually detected lane marking lines, i.e. white lines, is set to be higher than the recognition level of the lane marking information generated based on the location of a roadside object.

The computer unit 10 includes a route generator 12, a lateral distance calculator 14, and a main controller 16. Each of the route generator 12, the lateral distance calculator 14 and the main controller 16 are functional elements implemented based on tasks by a microcomputer, which includes, for example, a CPU, a memory, such as a ROM and/or RAM, and an I/O. At least part of each of the functional elements 12, 14, and 16 can be implemented by a common microcomputer, or the functional components 12, 14, and 16 can be implemented by individual microcomputers communicable with each other.

Hereinafter, for the sake of simplified description, the route generator 12, lateral distance calculator 14, and main controller 16 are comprised by a common microcomputer, and the route generator 12, lateral distance calculator 14, and main controller 16 are accessible to a common memory. FIG. 1 illustrates the common memory as a memory M.

The route generator 12 receives the first position-detection information, second position-detection information, and/or FSN information sent from the radar sensor 2 and the camera unit 4. Then, the route generator 12 estimates, in response to a command sent from the main controller 16, the travelled route of each of forward vehicles in accordance with the first position-detection information, second position-detection information, and/or FSN information; an identifier, referred to as a forward vehicle ID, is assigned by the main controller 16 to each of the forward vehicles.

Specifically, the route generator 12 uses at least one of the first position-detection information, the second position-detection information, and the FSN information obtained for one cycle to obtain, for this cycle, the detected positions of each of the forward vehicles assigned with a forward vehicle ID. The route generator 12 stores, in the memory M, plural data sets of the detected positions of each of the forward vehicles obtained in corresponding plural cycles. The plural data sets of the detected positions of each of the forward vehicles obtained in corresponding plural cycles will be referred to as historical information items of the corresponding one of the forward vehicles.

For example, when receiving the FSN information about each of the forward vehicles assigned with their forward vehicle IDs in one cycle, the route generator 12 stores, in the memory M, the detected positions, i.e. longitudinal and lateral positions relative to the own vehicle V, of each of the forward vehicles as a historical information item of the corresponding one of the forward vehicle.

When the plural data sets of the detected positions of each of the forward vehicles obtained in the corresponding plural cycles are stored in the memory M as the historical information items of the corresponding one of the forward vehicles, the route generator 12

1. Reads, from the memory M, the plural data sets of the detected positions of each of the forward vehicles as the historical information item of the corresponding one of the forward vehicles 2. For example perform Hough transform of the historical information item, i.e. the plural data sets of the detected positions, of each of the forward vehicles, thus calculating an approximate expression indicative of the travelled route of each of the forward vehicles. The approximate expression indicative of the travelled route of each of the forward vehicles will be referred to as a traveled-route information item of the corresponding one of the forward vehicles.

The route generator 12 stores, in the memory M, the travelled-route information item of each of the forward vehicles such that the travelled-route information item of each of the forward vehicles is correlated with the corresponding forward vehicle ID.

The route generator 12 also stores, in the memory M, a calculation-source information item for each of the travelled-route information items of the forward vehicles assigned with their forward vehicle IDs. The calculation-source information item for each of the travelled-route information items of the forward vehicles represents that the corresponding travelled-route information item is calculated mainly based on which of the first position-detection information, the second position-detection information, and the FSN information. Specifically, the calculation-source information item for each travelled-route information item represents that which of first position-detection information, the second position-detection information, and the FSN information in the corresponding travelled-route information item is most used to calculate the corresponding travelled-route information item.

The number of times the first position-detection information is used, the number of times the second position-detection information is used, and the number of times the FSN information is used can be respectively assigned with their corresponding weights.

The travelled-route information for each of the proceeding vehicles, which is correlated with the corresponding forward vehicle ID, will be referred to as a candidate route information item for the corresponding one of candidate forward vehicles.

The lateral distance calculator 14 calculates, for each of the candidate route information items stored in the memory M, a distance, i.e. a lateral distance, of the corresponding travelled route of the corresponding one of the candidate forward vehicles relative to the own vehicle V. Specifically, the lateral distance calculator 14 uses the center of gravity of the own vehicle V as a base point, and identifies a point of intersection between a straight line extending from the base point and each of the travelled route of each of the candidate forward vehicles. Then, the lateral distance calculator 14 calculates the distance between the base point and the point of intersection for each of the candidate forward vehicles as a lateral distance of the corresponding one of the candidate forward vehicles. The lateral distance calculator 14 stores, in the memory M, a lateral-distance information item for each of the candidate forward vehicles such that the lateral-distance information item for each of the candidate forward vehicles is correlated with the corresponding forward vehicle ID. The lateral-distance information item for each of the candidate forward vehicles includes the calculated lateral distance of the corresponding one of the candidate forward vehicles.

The main controller 16 receives the first position-detection information sent from the radar sensor 2, and the second position-detection information and/or FSN information sent from the camera unit 4. Then, the route generator 12 extracts forward vehicles except for oncoming vehicles from detected forward vehicles, and assigns a unique forward vehicle ID to each of the extracted forward vehicles.

Specifically, the main controller 16 identifies all the detected forward vehicles based on the type-feature information received from the camera unit 4 or the radar sensor 2, and categorizes each of the detected forward vehicles into any one of the set of preceding vehicles and the set of oncoming vehicles. Then, the main controller 16 assigns unique IDs to the respective extracted preceding vehicles categorized as the set of preceding vehicles. As a result, as described above, the extracted forward vehicles assigned with the respective forward-vehicle IDs are stored in the memory M.

1-2 Task

1-2-1 Travelled-Route Selecting Task

Figure 2:
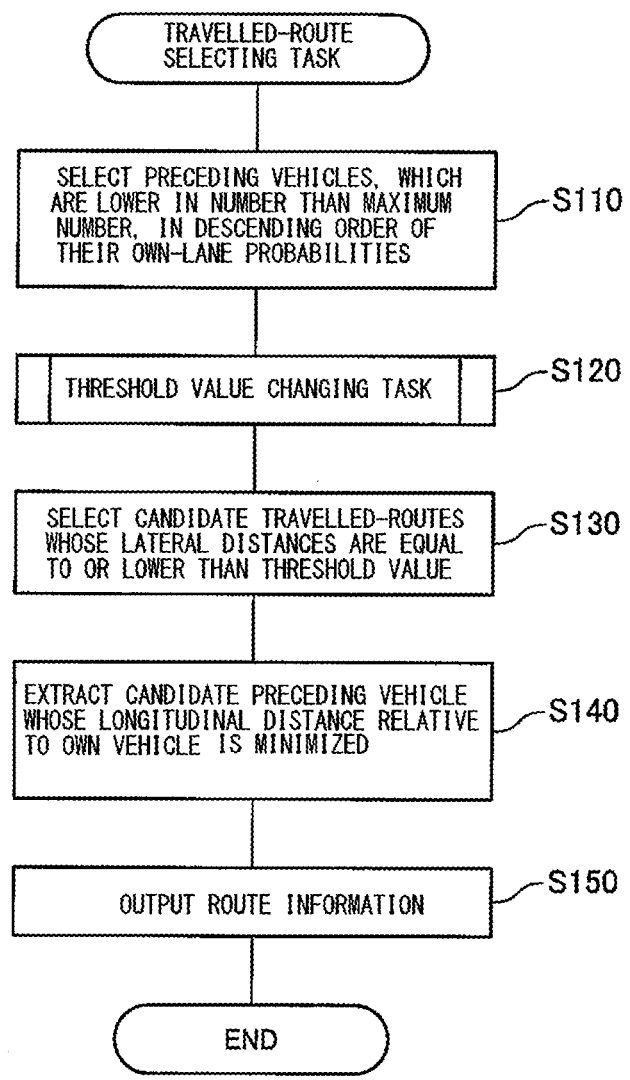
FIG. 2 is an example of a flowchart schematically illustrating a travelled-route selecting task according to the first embodiment.

Next, the following describes a travelled-route selecting task carried out by the main controller 16 with reference to a flowchart of FIG. 2. Note that the travelled-route selecting task is repeatedly launched in a predetermined cycle while, for example, the speed of the own vehicle V is equal to or higher than each of lower limit speed values; each of the lower limit speed values is defined for the corresponding one of the functions including the full speed ACC and the LTC.

When a current cycle of the travelled-route selecting task is launched, the main controller 16 refers to an own-lane probability map MAP previously stored in the memory M using the longitudinal and lateral positions of each of the forward vehicles, i.e. the preceding vehicles, assigned with the corresponding forward-vehicle ID, thus obtaining an own-lane probability of each of the preceding vehicles in step S110. Then, the main controller 16 selects, from the preceding vehicles, preceding vehicles in descending order according to their own-lane probabilities; the number of selected preceding vehicles, which will be referred to as the candidate preceding vehicles, should be within a predetermined maximum number in step S110.

Figure 3:
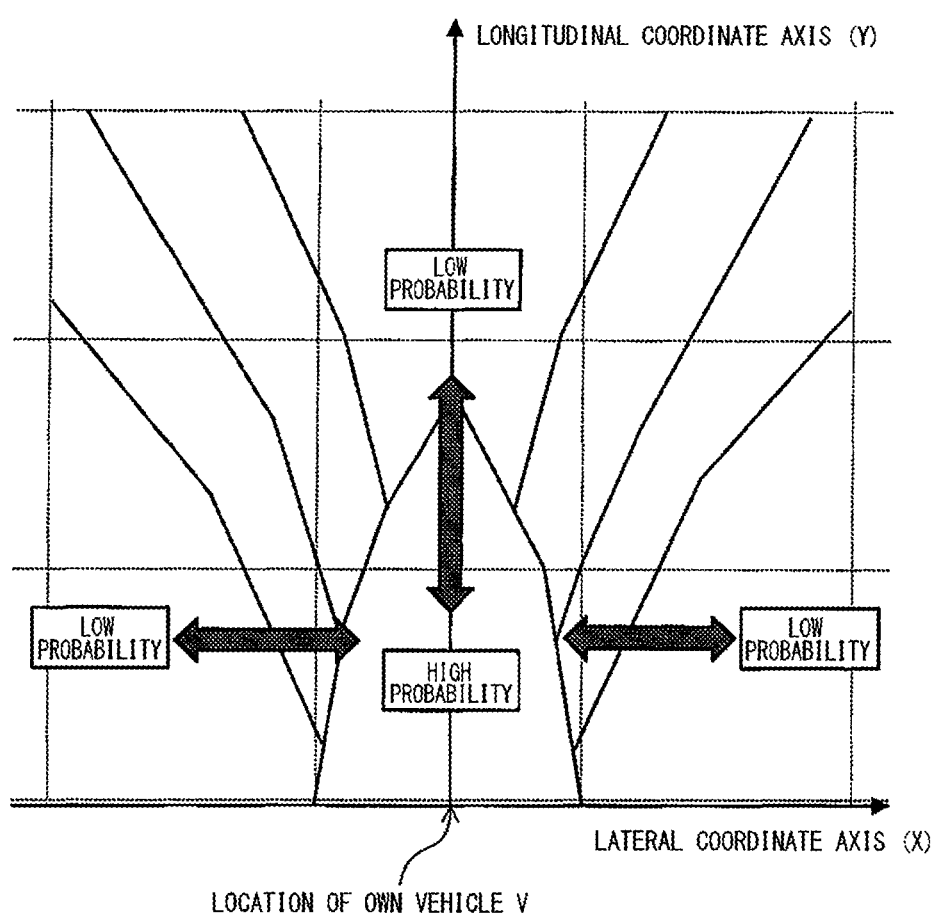
FIG. 3 is a graph for describing an own-lane probability map used in the first embodiment.

The own-lane probability of each preceding vehicle represents a probability that the corresponding vehicle is located on the same travelling lane of the own vehicle V. The own-vehicle lane map MAP includes own-lane probabilities previously defined for respective plural areas of a two-dimensional plane as illustrated in FIG. 3; each of the areas has a horizontal orientation and a distance from a reference location of the own vehicle V illustrated in FIG. 3, such as the origin of the two-dimensional plane. The own-lane probability for each of the areas represents a probability that a preceding vehicle located on the corresponding area is within the own lane of the own vehicle V.

Referring to FIG. 3, the lateral coordinate axis (X) of the own-lane probability map MAP represents the lateral coordinate axis of the two-dimensional coordinate plane, and the longitudinal coordinate axis (Y) of the own-lane probability map MAP represents the longitudinal coordinate axis of the two-dimensional coordinate plane.

In the own-lane probability map MAP, the own-lane probability of a preceding vehicle becomes higher when the preceding vehicle approaches the location of the own vehicle V in the lateral and longitudinal directions. In contrast, in the own-lane probability map MAP, the own-lane probability of a preceding vehicle becomes lower when the preceding vehicle moves away from the location of the own vehicle V in the lateral and longitudinal directions.

Using the own-lane probability map MAP enables maximum six preceding vehicles to be for example selected as candidate preceding vehicles as illustrated in FIG. 4A. Note that it is possible to eliminate, from the preceding vehicles selected as the candidate preceding vehicles, at least one of the preceding vehicles whose own-lane probability is lower than a predetermined threshold probability.

The forward-vehicle IDs corresponding to the respective selected candidate preceding vehicles are transmitted as commands from the main controller 16 to the route generator 12. In response to each of the commands, the route generator 12 generates the travelled route, referred to as a candidate travelled-route, for each of the candidate preceding vehicles whose number is within the predetermined maximum number (see FIG. 4B).

In step S120, the main controller 16 performs a threshold-value change task that changes a threshold value used to select at least one candidate travelled-route in step S130 described later. The threshold value is a value associated with the lateral distance from the own vehicle V to each of the candidate travelled routes. The threshold-value change task carried out in step S120 will be described later.

Next, in step S130, the main controller 16 selects, from the candidate travelled routes generated by the route generator 12, at least one candidate travelled-route that has the lateral distance, which is calculated by the lateral distance calculator 14, being equal to or lower than the predetermined threshold value. For example, from the maximum six candidate travelled routes, two candidate travelled routes as illustrated in FIG. 5A are selected such that each of the selected two candidate travelled routes satisfies a first determination condition, an example of which is the threshold condition set forth above.

As described later, the threshold value is set to be a value equal to the width of the own lane or the width of the own vehicle V or around the value.

If the main controller 16 selects a single candidate preceding vehicle in step S110, and if the candidate travelled-route of the selected candidate preceding vehicle does not satisfy the first determination condition in step S130, the main controller 16 terminates the travelled-route selecting task.

Following the operation in step S130, in step S140, the main controller 16 extracts, from the candidate preceding vehicles having the respective candidate travelled routes selected in step S130, a candidate preceding vehicle having the shortest distance relative to the own vehicle V in all the distances of the candidate preceding vehicles relative to the own vehicle V, which have the respective candidate travelled routes selected in step S130. Then, the main controller 16 determines the candidate travelled-route of the extracted candidate preceding vehicle as a definitive target travel route in step S140.

That is, as illustrated in FIG. 5B, from the two candidate travelled routes, a single candidate travelled-route as illustrated in FIG. 5B is selected as the target travel route such that the selected candidate travelled-route satisfies a second determination condition, an example of which is the minimum distance condition set forth above.

Note that, as a parameter indicative of the distance relative to the own vehicle V, the longitudinal distance of each of the candidate preceding vehicles relative to the own vehicle V in the longitudinal direction of the vehicle V can be used.

In step S150, the main controller 16 outputs, to the at least one ECU 100, information, i.e. route information, indicative of the candidate travelled-route selected as the target travel route in step S140, and thereafter, terminates the travelled-route selecting task. Note that the travelled-route selecting task returns to the operation in step S110 when being terminated, so that the travelled-route selecting task is constantly repeated until the own vehicle speed is equal to or lower than the lower limit speed values.

1-2-2 Threshold Value Change Task

Figure 6:
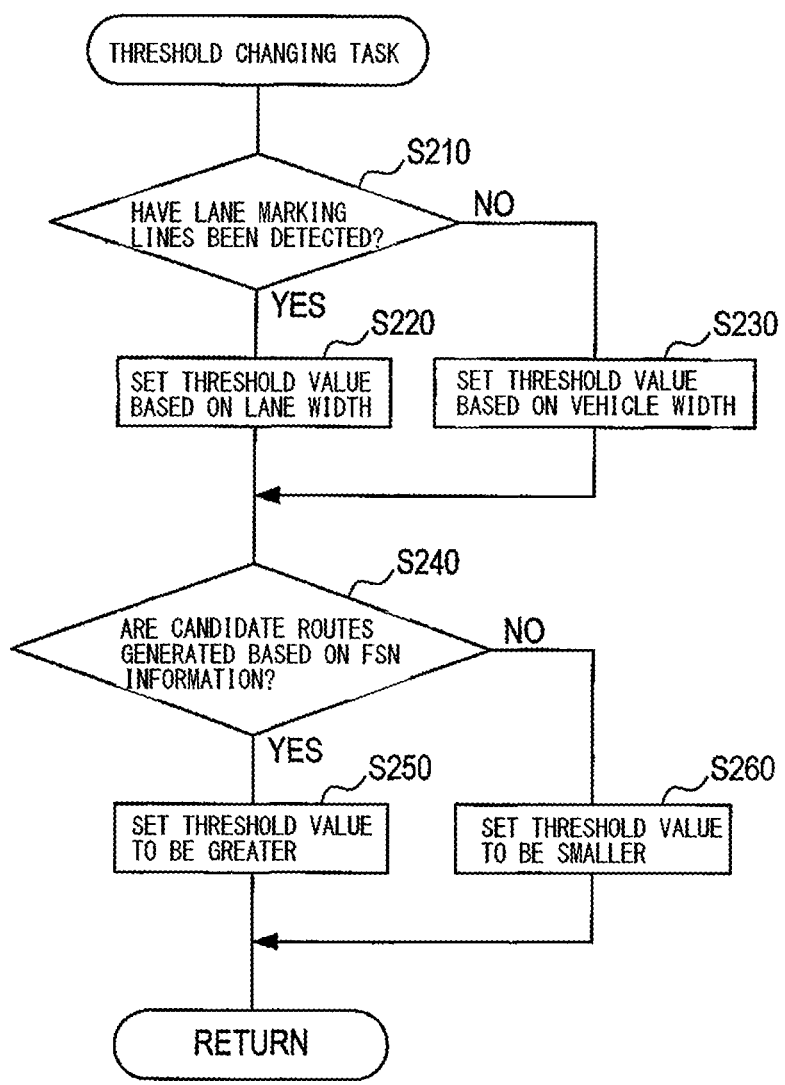
FIG. 6 is an example of a flowchart schematically illustrating a threshold value changing task included in the travelled-route selecting task according to the first embodiment.

Next, the following describes the threshold value change task carried out by the main controller 16 in step S120 with reference to a flowchart of FIG. 6.

When starting the threshold value change task, the main controller 16 determines whether the lane marking lines have been detected by the lane marking detector 6C in step S210.

Specifically, the main controller 16 determines whether the lane marking information has been received from the lane marking detector 6C for each of predetermined output timings in step S210. If the lane marking information has been received from the lane marking detector 6C for each of the output timings, the main controller 16 has determined for the corresponding output timing that the lane marking information has been detected. Otherwise, if the lane marking information has not been received from the lane marking detector 6C for each of the output timings, the main controller 16 has determined for the corresponding output timing that the lane marking information has not been detected.

When the lane marking lines have been detected by the lane marking detector 6C, the main controller 16 sets the threshold value in accordance with the width of the travelling lane, i.e. the own lane, of the own vehicle V in step S220. Specifically, in step S220, the main controller 16 identifies the width of the own lane based on the information about the width between the right and left marking lines included in the lane marking information received in step S210. Then, the main controller 16 selectively performs one of 1. Adding the offset, i.e. the offset defined as a coefficient of the model equation, to the identified width of the own lane as a reference offset to correspondingly obtain a value as the threshold value used in step S130

2. Subtracting the offset, i.e. the reference offset, from the identified width of the own lane to correspondingly obtain a value as the threshold value used in step S130

3. Multiply the coefficient corresponding to the reference offset to the identified width of the own lane to correspondingly obtain a value as the threshold value used in step S130

Thereafter, the threshold value change task proceeds to step S240.

Note that, in step S220, the main controller 16, for example, increases the offset to be added to the lane width, or increase the coefficient to be multiplied to the lane width in accordance with the recognition level included in the lane marking information received in step S210. This enables the threshold value to be greater as the recognition level of the own lane becomes higher.

Otherwise, when the lane marking lines have not been detected by the lane marking detector 6C, the main controller 16 sets the threshold value in accordance with the width of the own vehicle V in step S230. Specifically, in step S230, the main controller 16 identifies the width of the own vehicle V based on the information associated with the width of the own vehicle V stored in, for example, the memory. Then, the main controller 16 adds the offset to the width of the own vehicle V, or multiplies a coefficient equal to or higher than 1 to the width of the own vehicle V to correspondingly obtain a value as the threshold value used in step S130

As described above, the main controller 16 changes the threshold value used in step S130 depending on whether the lane marking lines have been detected by the lane marking detector 6C in steps S210, S220, and S230. In particular, when the lane marking lines have been detected by the lane marking detector 6C, the main controller 16 increases the threshold value to be greater as the recognition level of the own lane becomes higher.

Next, the main controller 16 determines whether the candidate travelled-route of the at least one candidate preceding vehicle has been generated by the route generator 12 in accordance with the FSN information as the results calculated by the FSN generator 8 in step S240.

Specifically, in step S240, the main controller 16 refers to the calculation-source information stored in the memory using the forward-vehicle ID corresponding to each of the candidate preceding vehicles selected in step S110. This causes the main controller 16 to determine whether the FSN Information is most used by the route generator 12 among the first position-detection information, the second position-detection information, and the FSN information when generating the travelled route of each of the selected candidate preceding vehicles in step S240.

Upon determining that the FSN Information is most used by the route generator 12 among the first position-detection information as a result of the determination in step S240, the second position-detection information, and the FSN information, the main controller 16 determines that each of the candidate travelled-routes is regarded to be calculated based on the FSN information.

Otherwise, upon determining that the FSN Information is least used by the route generator 12 among the first position-detection information as a result of the determination in step S240, the second position-detection information, and the FSN information, the main controller 16 determines that each of the candidate travelled-routes is regarded to be calculated based on the first detection-position information detected by the radar sensor 2 or the second detection-position information detected by the vehicle detector 6B.

When it is determined that each of the candidate travelled-routes is regarded to be calculated based on the FSN information (YES in step S240), the main controller 16 sets the threshold value used in step S130 to be greater than the threshold value set in either step S220 or step S230 in step S250.

Specifically, in step S250, the main controller 16 increases the offset to be added to the width of the own vehicle V in step S220 to be greater than the reference offset, or increases the coefficient to be multiplied to the width of the own vehicle V in step S220 to be greater than the coefficient corresponding to the reference offset. Alternatively, in step S250, the main controller 16 reduces the offset to be subtracted from the width of the own vehicle V in step S220 to be smaller than the reference offset.

When each of the candidate travelled-routes is regarded to be calculated based on the first detection-position information detected by the radar sensor 2 or the second detection-position information detected by the vehicle detector 6B (NO in step S240), the main controller 16 sets the threshold value used in step S130 to be smaller than the threshold value set in either step S220 or step S230 in step S260.

Specifically, in step S260, the main controller 16 reduces the offset to be added to the width of the own vehicle V in step S220 to be smaller than the reference offset, or reduces the coefficient to be multiplied to the width of the own vehicle V in step S220 to be smaller than the coefficient corresponding to the reference offset. Alternatively, in step S260, the main controller 16 increases the offset to be subtracted from the width of the own vehicle V in step S220 to be greater than the reference offset.

As described above, the main controller 16 changes the threshold value used in step S130 depending on how the candidate travelled-route of each of the selected candidate preceding vehicles is generated in steps S240, S250, and S260. In other words, the main controller 16 changes the threshold value used in step S130 depending on the detection accuracy of the candidate travelled-route of each of the selected candidate preceding vehicles. In particular, the main controller 16 increases the threshold value used in step S130 to be greater as the detection accuracy of each of the selected candidate preceding vehicles becomes higher, or reduces the threshold value used in step S130 to be smaller as the detection accuracy of each of the selected candidate preceding vehicles becomes lower.

The threshold value set as described above is used in step S130 of the travelled-route selecting task for narrowing the candidate travelled-routes generated by the route generator 12 to a lower number of candidate travelled-routes in view of the lateral distances of the detected candidate travelled-routes relative to the own vehicle V.

1-3 Advantageous Effect

The travelled-route selecting apparatus 1 according to the first embodiment achieves the following advantageous effects.

The travelled-route selecting apparatus 1 refers to the own-lane probability map MAP using the relative location of each of the preceding vehicles assigned with the respective forward-vehicle IDs to correspondingly obtain the own-lane probability of each of the preceding vehicles. Then, the travelled-route selecting apparatus 1 selects, from the preceding vehicles, candidate preceding vehicles in descending order according to their own-lane probabilities; the number of the selected candidate preceding vehicles should be within a predetermined maximum number. Thereafter, the travelled-route selecting apparatus 1 generates the candidate travelled-route for each of the candidate preceding vehicles. Specifically, the travelled-route selecting apparatus 1 is configured not to generate candidate travelled-routes for all the preceding vehicles detected by the radar sensor 2 and/or the camera unit 4, but to generate the candidate travelled-route for each of the candidate preceding vehicles whose number are narrowed in descending order according to their own-lane probabilities from the number of all the preceding vehicles.

This therefore enables the travelled-route selecting apparatus 1 to achieve, as a first advantageous effect, reduction in the load required to generate the candidate travelled-routes.

The travelled-route selecting apparatus 1 also uses the threshold value associated with the lateral distances of the candidate travelled-routes relative to the own vehicle V to thereby select, from the candidate travelled-routes, at least one candidate travelled-route located within the threshold value. For this reason, the travelled-route selecting apparatus 1 enables the candidate travelled-route, whose location is close to the own vehicle V and whose lateral distance is within the threshold value relative to the own vehicle V, to be selected.

This therefore enables the travelled-route selecting apparatus 1 to achieve a second advantageous effect of preventing erroneous selection of the candidate travelled-route of an adjacent vehicle that is travelling on an adjacent lane, which is far away from the own vehicle V.

Figure 7:
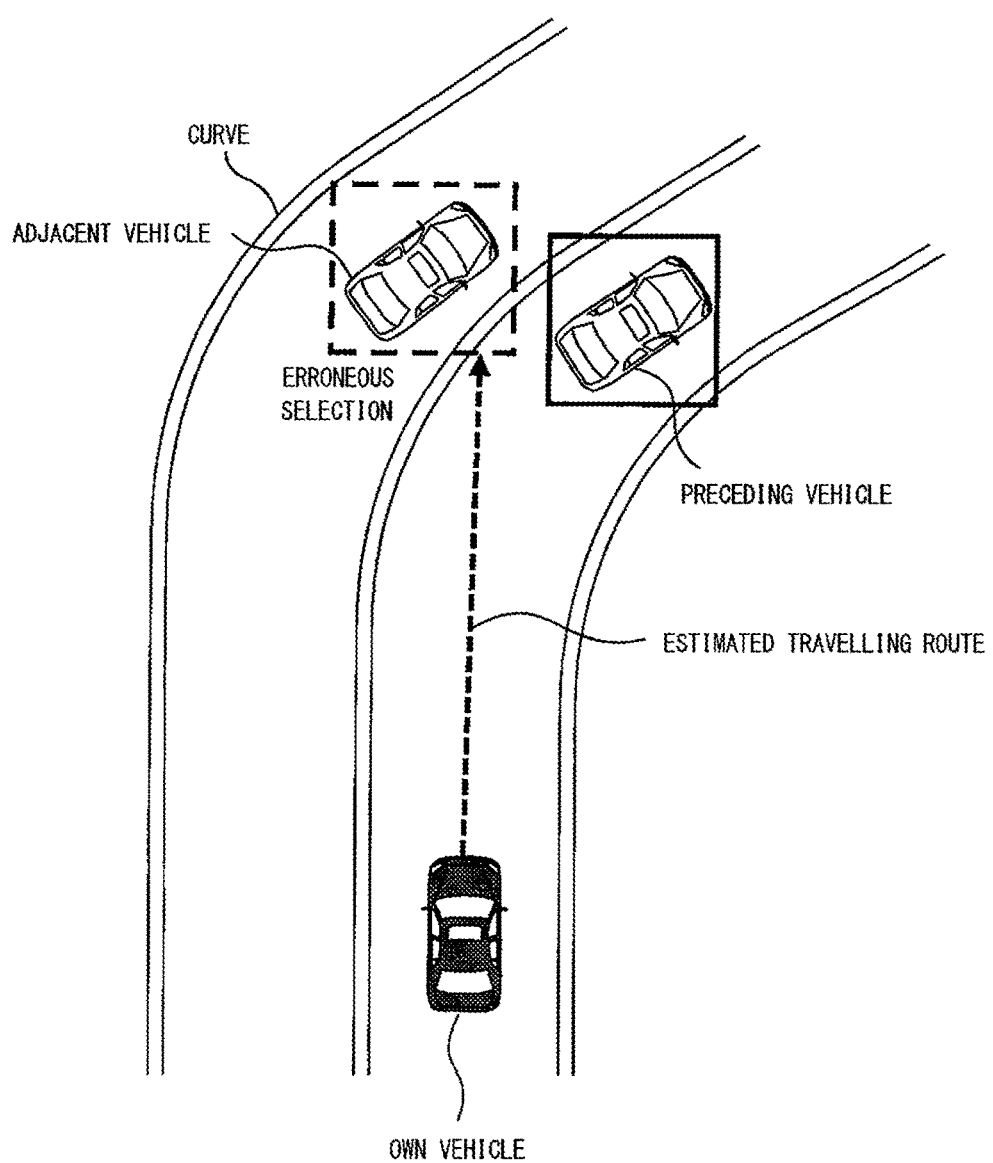
FIG. 7 is a view illustrating a conventional problem.

Referring to FIG. 7, let us assume that the own travelling lane of the own vehicle V and an adjacent lane of the own lane have a curve in their front. In this assumption, if a preceding vehicle is travelling on the curve of the own travelling lane of the own vehicle V, there may be a case where the preceding vehicle is deviated from the estimated travelling route of the own vehicle V during execution of the technology disclosed in patent document 1. In this case, if an adjacent vehicle, which is travelling on the curve of the adjacent lane, enters the estimated travelling route of the own vehicle V, the technology disclosed in patent document 1 may erroneously select the adjacent vehicle as a tracking target although the preceding vehicle is present on the same own travelling lane.

Even if a vehicle cuts in on the own travelling lane from the adjacent lane, the lateral distance of the travelled route of the vehicle relative to the own vehicle is clearly longer than the threshold value that is set to be equal to the width of the own travelling vehicle or thereabout. This is because the vehicle, which cuts in on the own travelling vehicle, has travelled on the adjacent lane.

Specifically, until such a cutting-in vehicle on the adjacent lane is stayed on the own travelling lane, that is, a given time has elapsed since the entrance of the cutting-in vehicle in the own travelling lane, the travelled-route selecting apparatus 1 according to the first embodiment makes it difficult to select the travelled route of the cutting-in vehicle as a candidate travelled-route. For this reason, the travelled-route selecting apparatus 1 achieves a third advantageous effect of preventing the travelled route of a vehicle, which immediately moves from one-side adjacent lane to the other-side adjacent lane via the own travelling lane, from being erroneously selected as a candidate travelled-route. Note that such a vehicle, which immediately moves from one-side adjacent lane to the other-side adjacent lane via the own travelling lane, will be referred to as a continuous cutting-in vehicle.

The travelled-route selecting apparatus 1 extracts, from the selected candidate travelled-routes whose lateral distances relative to the own vehicle V are within the threshold value, a candidate preceding vehicle having the shortest distance relative to the own vehicle V in all the distances of the selected candidate preceding vehicles relative to the own vehicle V. Then, the travelled-route selecting apparatus 1 selects the travelled route of the extracted candidate preceding vehicle as the definitive target travel route.

This enables the travelled-route selecting apparatus 1 to select the travelled route of a candidate preceding vehicle whose behavior is close to the behavior of the own vehicle V as the definitive target travel route. This increases the probability that travelled routes of vehicles, such as a continuous cutting-in vehicle, whose behaviors are different from the behavior of the own vehicle V, are eliminated from the definitive target travel route. This therefore enables the travelled-route selecting apparatus 1 to properly select the definitive target travel route, and output the definitive target travel route to the at least one ECU 100 as route information.

The above configuration of the travelled-route selecting apparatus 1 enables the ADAS, which is comprised of the apparatus 1 and the at least one ECU 100, to achieve, as a fourth advantageous effect, the improvement of 1. The stability of the tracking task in the full speed ACC
2. The stability of the target travelling line determined by the LTC.

This therefore prevents instable tracking operations of the own vehicle V and instable travelling operations of the own vehicle V along the instable target travelling line; these instable operations would be caused from selection of the travelled route of a preceding vehicle whose behavior is different from the behavior of the own vehicle V as the target travel route. This prevention improves fuel economy of the own vehicle V.

The travelled-route selecting apparatus 1 is configured to set the threshold value based on the width of the own travelling lane if the lane marking lines have been detected by the lane marking detector 6C; the threshold value is used to reduce the number of candidate travelled-routes in view of the lateral distances of their candidate travelled-routes relative to the own vehicle V. In contrast, the travelled-route selecting apparatus 1 is configured to set the threshold value based on the width of the own vehicle V if the lane marking lines have not been detected by the lane marking detector 6C.

This configuration enables an optimum threshold value to be set depending on whether there is a lane on the travelling road of the own vehicle V; the travelling road represents one of travelling conditions of the own vehicle V. This therefore enables the route selecting apparatus 1 to achieve a fifth advantageous effect of preventing selection of erroneous candidate travelled-routes due to whether there is a lane on the travelling road of the own vehicle V.

The travelled-route selecting apparatus 1 is configured such that the threshold value for the following first case is greater than the threshold value for the following second case; the threshold value is used to reduce the number of candidate travelled-routes in view of the lateral distances of their candidate travelled-routes relative to the own vehicle V. The first case is that the FSN information as a result of the calculation by the FSN generator 8 is most used among the first position-detection information, the second position-detection information, and the FSN information in generation of the travelled route of each of the selected candidate preceding vehicles. The second case is that the first position-detection information or the second position-detection information is most used among the first position-detection information, the second position-detection information, and the FSN information in generation of the travelled route of each of the selected candidate preceding vehicles.

This configuration enables the route selecting apparatus 1 to achieve a sixth advantageous effect of further increasing the probability that travelled routes of vehicles, such as an adjacent vehicle or a continuous cutting-in vehicle, whose behaviors are different from the behavior of the own vehicle V, are eliminated from the candidate travelled-routes.

The travelled-route selecting apparatus 1 is configured such that the threshold value becomes greater as the recognition level of the own lane becomes higher, and the threshold value becomes smaller as the recognition level of the own lane becomes lower; the threshold value is used to reduce the number of candidate travelled-routes in view of the lateral distances of their candidate travelled-routes relative to the own vehicle V.

This configuration enables the route selecting apparatus 1 to achieve a seventh advantageous effect of setting a proper threshold value in accordance with the recognition level of the own lane based on the travelling conditions of the own vehicle V.

Second Embodiment 2-1 Structure

A travelled-route selecting apparatus according to the second embodiment is basically similar to the travelled-route selecting apparatus 1 according to the first embodiment except for the following points. So, the following mainly describes the different points, and omits or simplifies descriptions of like parts between the first and second embodiments, thus eliminating redundant description.

The travelled-route selecting apparatus 1 according to the first embodiment uses the threshold value, which will referred to as a first threshold value, associated with the lateral distance from the own vehicle V to each of the candidate travelled routes generated by the route generator 12 to thereby select, from the candidate travelled routes generated by the route generator 12, at least one candidate travelled-route that has the lateral distance, which is calculated by the lateral distance calculator 14, being equal to or lower than the first threshold value (see step S130 and FIG. 5A).

Then, the travelled-route selecting apparatus 1 extracts, from the candidate preceding vehicles having the respective candidate travelled routes selected in step S130, a candidate preceding vehicle having the shortest distance, i.e. longitudinal distance, relative to the own vehicle V in all the distances, i.e. the longitudinal distances, of the candidate preceding vehicles relative to the own vehicle V, which have the respective candidate travelled routes selected in step S130 (see FIG. 5B and step S140). Then, the travelled-route selecting apparatus 1 determines the candidate travelled-route of the extracted candidate preceding vehicle as the definitive target travel route (see FIG. 5B and step S140).

In contrast, the travelled-route selecting apparatus according to the second embodiment uses a threshold value, which will referred to as a second threshold value, associated with the longitudinal distance from the own vehicle V to each of the candidate travelled routes generated by the route generator 12 to thereby select, from the candidate travelled routes generated by the route generator 12, at least one candidate travelled-route that has the longitudinal distance, which is calculated by the longitudinal distance calculator 12, being equal to or lower than the second threshold value.

Then, the travelled-route selecting apparatus 1 extracts, from the candidate preceding vehicles having the respective selected candidate travelled routes, a candidate preceding vehicle having the shortest distance, i.e. lateral distance, relative to the own vehicle V in all the distances, i.e. the lateral distances, of the candidate preceding vehicles relative to the own vehicle V, which are calculated by the lateral distance calculator 14. Then, the travelled-route selecting apparatus determines the candidate travelled-route of the extracted candidate preceding vehicle as the definitive target travel route.

2-2 Task

Figure 8:
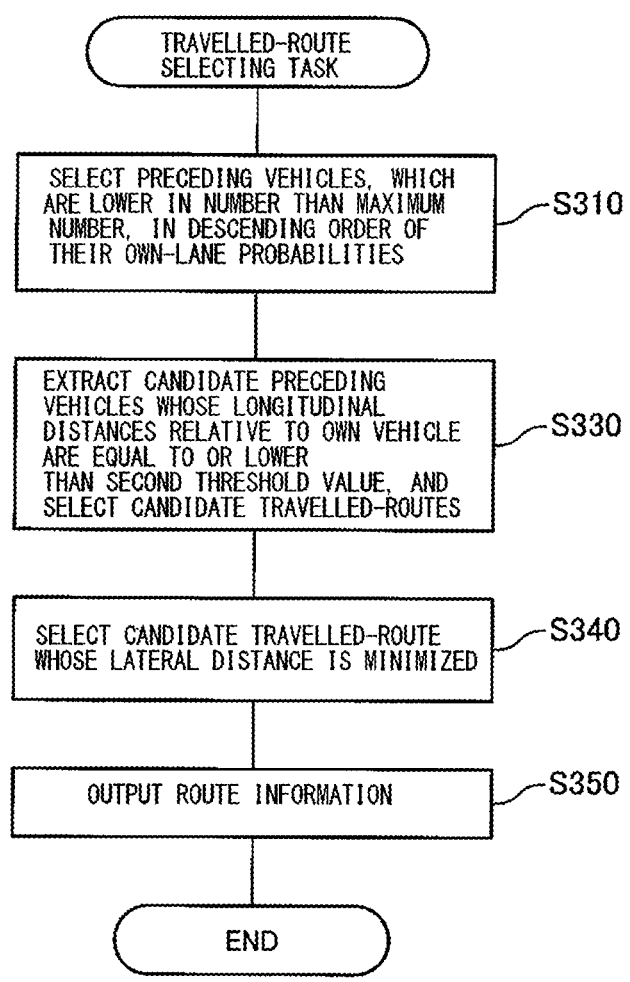
FIG. 8 is an example of a flowchart schematically illustrating a travelled-route selecting task according to the second embodiment of the present invention.

Next, the following describes a travelled-route selecting task carried out by the main controller 16 with reference to a flowchart of FIG. 8 in place of the travelled-route selecting task illustrated in FIG. 2. Note that the operations in steps S310 and S350 in FIG. 8 are similar to steps S110 and S150 in FIG. 2, so that the descriptions of which are at least partially omitted.

When a current cycle of the travelled-route selecting task is launched, the main controller 16 refers to the own-lane probability map MAP previously stored in the memory M using the longitudinal and lateral positions of each of the preceding vehicles assigned with the corresponding forward-vehicle ID, thus obtaining the own-lane probability of each of the preceding vehicles in step S310.

Then, the main controller 16 selects, from the preceding vehicles, preceding vehicles in descending order according to their own-lane probabilities; the number of selected preceding vehicles, which will be referred to as the candidate preceding vehicles, should be within the predetermined maximum number in step S310.

Next, in the following step S330, the main controller 16 selects, from the candidate preceding vehicles having the respective candidate travelled routes generated by the route generator 12, candidate preceding vehicles each of which has the distance, i.e. the longitudinal distance, being equal to or lower than the second threshold value. Then, the main controller 16 selects the candidate travelled-routes of the respective extracted candidate preceding vehicles in step S330. This enables the candidate travelled routes, each of which satisfies a second determination condition, an example of which is the threshold condition set forth above, to be selected.

Next, in step S340, the main controller 16 selects, from the candidate travelled routes selected in step S330, a candidate travelled-route that has the shortest lateral distance in all the lateral distances of the selected candidate travelled routes, which are calculated by the lateral distance calculator 14. Then, the main controller 16 determines the extracted candidate travelled-route of the corresponding candidate preceding vehicle as the definitive target travel route in step S340. This enables the candidate travelled route, which satisfies a first determination condition, an example of which is the minimum distance condition set forth above, to be selected.

In step S350, the main controller 16 outputs, to the at least one ECU 100, information, i.e. route information, indicative of the candidate travelled-route selected as the target travel route in step S340, and thereafter, terminates the travelled-route selecting task. Note that the travelled-route selecting task returns to the operation in step S310 when being terminated, so that the travelled-route selecting task is constantly repeated until the own vehicle speed is equal to or lower than the lower limit speed values.

2-3 Advantageous Effect

The travelled-route selecting apparatus 1 according to the second embodiment described in detail set forth above achieves the following advantageous effects in addition to the first and third advantageous effects.

The travelled-route selecting apparatus 1 uses the second threshold value associated with the longitudinal distances of the candidate travelled-routes relative to the own vehicle V to thereby select, from the candidate travelled-routes, candidate travelled-routes located within the second threshold value. For this reason, the travelled-route selecting apparatus 1 enables the candidate travelled-routes, whose longitudinal distances are within the second threshold value relative to the own vehicle V, to be selected.

This therefore enables the travelled-route selecting apparatus 1 to increase the probability that travelled routes of vehicles, such as distant preceding vehicles, whose behaviors are different from the behavior of the own vehicle V, are eliminated from the candidate travelled-routes.

The travelled-route selecting apparatus 1 extracts, from the selected candidate travelled-routes whose longitudinal distances relative to the own vehicle V are within the second threshold value, a candidate preceding vehicle having the shortest lateral distance relative to the own vehicle V in all the lateral distances of the selected candidate preceding vehicles relative to the own vehicle V. Then, the travelled-route selecting apparatus 1 selects the travelled route of the extracted candidate preceding vehicle as the definitive target travel route.

This enables the travelled-route selecting apparatus 1 to properly select the definitive target travel route, and output the definitive target travel route to the at least one ECU 100 as route information.

The above configuration of the travelled-route selecting apparatus 1 enables the ADAS, which is comprised of the apparatus 1 and the at least one ECU 100, to achieve the improvement of 1. The stability of the tracking task in the full speed ACC
2. The stability of the target travelling line determined by the LTC.

This therefore prevents instable tracking operations of the own vehicle V and instable travelling operations of the own vehicle V along the instable target travelling line; these instable operations would be caused from selection of the travelled route of a preceding vehicle whose behavior is different from the behavior of the own vehicle V as the target travel route. This prevention improves fuel economy of the own vehicle V.

3 Modifications

The embodiments of the present invention have been described, but the present invention is not limited to the above embodiments, and can be variously modified.

The first embodiment variably sets the first threshold value in accordance with both 1. The first condition of whether the lane marking lines have been detected, which includes the recognition level of the own lane
2. The second condition of whether the calculation-source information of each of the candidate travelled-routes represents the FSN information The present invention is however not limited thereto.

Specifically, the first embodiment can variably set the first threshold value in accordance with any one of the first condition and the second condition.

The first embodiment also can variably set the first threshold value in accordance with any one of 1. Information indicative of whether the lane marking lines have been detected
2. Another information indicative of the recognition level of the own lane The first embodiment variably sets the first threshold value to be lower when the calculation-route information for each of the candidate travelled-routes does not represent the FSN information, but the present invention is not limited thereto.

Specifically, the present invention can cause the first threshold value in the first case where the calculation-route information for each of the candidate travelled-routes represents the first position-detection information detected by the radar sensor 2 to be different from the first threshold value in the second case where the calculation-route information for each of the candidate travelled-routes represents the second position-detection information detected by the vehicle detector 6B.

Specifically, the present invention can cause the first threshold value in the first case where the calculation-route information for each of the candidate travelled-routes represents the first position-detection information detected by the radar sensor 2 to be smaller than the first threshold value in the second case where the calculation-route information for each of the candidate travelled-routes represents the second position-detection information detected by the vehicle detector 6B.

It is possible to

1. Determine, in place of the calculation-source information for each of the candidate travelled-routes, the detection accuracy of the positions, i.e. historical positions, of each of the candidate preceding vehicles in accordance with change of the detection conditions of at least one of the radar sensor 2 and the camera unit 4

2. Increase the first threshold value to be greater as the detection accuracy of the positions of each of the candidate preceding vehicles becomes higher The functions of one element in each of the above embodiments can be distributed as plural elements, and the functions that plural elements have can be combined into one element. At least part of the structure of each of the above embodiments can be replaced with a known structure having the same function as the at least part of the structure of the corresponding embodiment. A part of the structure of each of the above embodiments can be eliminated. At least part of the structure of each of the above embodiments can be added to or replaced with the structure of the other embodiment. All aspects included in the technological ideas specified by the language employed by the claims constitute embodiments of the present invention.

The present invention can be implemented by various embodiments in addition to the travelled-route selecting apparatuses 1; the various embodiments include systems each including one of the above travelled-route selecting apparatuses 1, programs for serving a computer as each of the travelled-route selecting apparatuses 1, storage media storing the programs, and travelled-route selecting methods.

| Reference Sins List | |
|---|---|
| 1: Travelled-route selecting apparatus | 2: Radar sensor |
| 4: Camera unit | 6: Camera sensor |
| 6A: Imaging unit | 6B: Vehicle detector |
| 6C: Lane marking detector | 8: FSN generator |
| 10: Computer unit | 12: Route generator |
| 14: Lateral distance calculator | 16: Main controller |

The invention claimed is:

1. A travelled-route selecting apparatus comprising:
an other vehicle detecting means configured to detect other vehicles in front of an own vehicle;
a route generating means configured to generate a travelled route of each of the other vehicles detected by the other vehicle detecting means;
a first route selecting means configured to select, from the travelled routes of the other vehicles generated by the route generating means, one or more travelled routes, the one or more travelled routes each having a relative distance relative to the own vehicle equal to or lower than a predetermined threshold value; and
a second route selecting means configured to select, from the travelled routes selected by the first route selecting means, a travelled route corresponding to a selected other vehicle, the selected other vehicle being the closest to the own vehicle among the other vehicles corresponding to the travelled routes selected by the first route selecting means.

2. The travelled-route selecting apparatus according to claim 1, wherein:
the first route selecting means is configured to select the one or more travelled routes each having a lateral distance relative to the own vehicle, each of the lateral distances of the one or more travelled routes satisfying a first determination condition that the corresponding one of the lateral distances being equal to or lower than a first threshold value as the predetermined threshold value; and
the second route selecting means is configured to, when the travelled routes are selected by the first route selecting means, select, from the travelled routes selected by the first route selecting means, the travelled route that satisfies a second determination condition that a longitudinal distance of the travelled route relative to the own vehicle is the shortest in the longitudinal distances of all the travelled routes relative to the own vehicle.

3. The travelled-route selecting apparatus according to claim 2, further comprising:
a threshold value changing means configured to change the first threshold value.

4. The travelled-route selecting apparatus according to claim 3, wherein, when the travelled routes of the other vehicles generated by the route generating means are defined as candidate vehicles, the threshold value changing means is configured to:
increase, based on a detection accuracy of each of the candidate vehicles by the other vehicle detecting means, the first threshold value of the corresponding one of the travelled routes.

5. The travelled-route selecting apparatus according to claim 3, further comprising:
an imaging means configured to capture an image ahead of the own vehicle;
a radar means configured to transmit radar waves in front of the own vehicle, and receive echoes based on the respective transmitted radar waves,
at least one of the imaging means and the radar means being configured to calculate a position of each of the other vehicles in accordance with corresponding at least one of the captured image and echoes; and
an FSN position calculating means configured to, when the positions of the other vehicles are calculated by both the imaging means and the radar means, calculate a position of each of the other vehicles in accordance with a first calculation result calculated by the imaging means, and a second calculation result calculated by the radar means,
wherein:
the route generating means is configured to generate the travelled route of each of the other vehicles in accordance with at least one of the first calculation result, the second calculation result, and a third calculation result calculated by the FSN position calculating means; and
the threshold value changing means further comprises:
a threshold value setting means configured to set the first threshold value such that:
the first threshold value when the travelled route of each of the other vehicles is generated in accordance with the third calculation result is greater than the first threshold when the travelled route of each of the other vehicles is generated in accordance with the first calculation result or the second calculation result.

6. The travelled-route selecting apparatus according to claim 4, further comprising:
an imaging means configured to capture an image of a front of the own vehicle;
a radar means configured to transmit radar waves in front of the own vehicle, and receive echoes based on the respective transmitted radar waves,
at least one of the imaging means and the radar means being configured to calculate a position of each of the other vehicles in accordance with corresponding at least one of the captured image and echoes; and
an FSN position calculating means configured to, when the positions of the other vehicles are calculated by both the imaging means and the radar means, calculate a position of each of the other vehicles in accordance with a first calculation result calculated by the imaging means, and a second calculation result calculated by the radar means, wherein:

the route generating means is configured to generate the travelled route of each of the other vehicles in accordance with at least one of the first calculation result, the second calculation result, and a third calculation result calculated by the FSN position calculating means; and the threshold value changing means further comprises:

a threshold value setting means configured to set the first threshold value such that:

the first threshold value when the travelled route of each of the other vehicles is generated in accordance with the third calculation result is greater than the first threshold when the travelled route of each of the other vehicles is generated in accordance with the first calculation result or the second calculation result.

7. The travelled-route selecting apparatus according to claim 3, further comprising:

a lane recognizing means configured to recognize, based on the captured image of the front of the own vehicle, an own lane as a travelling lane of the own vehicle, wherein:

the threshold value changing means is configured to:

increase, based on a recognition level of the own lane by the lane recognition means, the first threshold value of the corresponding one of the travelled routes as the recognition level becomes higher.

8. The travelled-route selecting apparatus according to claim 4, further comprising:

a lane recognizing means configured to recognize, based on the captured image of the front of the own vehicle, an own lane as a travelling lane of the own vehicle, wherein:

the threshold value changing means is configured to:

increase, based on a recognition level of the own lane by the lane recognition means, the first threshold value of the corresponding one of the travelled routes as the recognition level becomes higher.

9. The travelled-route selecting apparatus according to claim 5, further comprising:

a lane recognizing means configured to recognize, based on the captured image of the front of the own vehicle, an own lane as a travelling lane of the own vehicle, wherein:

the threshold value changing means is configured to:

increase, based on a recognition level of the own lane by the lane recognition means, the first threshold value of the corresponding one of the travelled routes as the recognition level becomes higher.

10. The travelled-route selecting apparatus according to claim 6, further comprising:

a lane recognizing means configured to recognize, based on the captured image of the front of the own vehicle, an own lane as a travelling lane of the own vehicle, wherein:

the threshold value changing means is configured to:

increase, based on a recognition level of the own lane by the lane recognition means, the first threshold value of the corresponding one of the travelled routes as the recognition level becomes higher.

11. The travelled-route selecting apparatus according to claim 3, further comprising:

a lane detection means configured to detect, based on the captured image of the front of the own vehicle, lane marking lines of a travelling lane of the own vehicle, wherein:

the threshold value changing means further comprises:

a second threshold value setting means configured to:

set, when the lane marking lines are detected by the lane detection means, the threshold value based on a width of the travelling lane; and set, when the lane marking lines are not detected by the lane detection means, the threshold value based on a width of the own vehicle.

12. The travelled-route selecting apparatus according to claim 4, further comprising:

a lane detection means configured to detect, based on the captured image of the front of the own vehicle, lane marking lines of a travelling lane of the own vehicle, wherein:

the threshold value changing means further comprises:

a second threshold value setting means configured to:

set, when the lane marking lines are detected by the lane detection means, the threshold value based on a width of the travelling lane; and set, when the lane marking lines are not detected by the lane detection means, the threshold value based on a width of the own vehicle.

13. The travelled-route selecting apparatus according to claim 5, further comprising:

a lane detection means configured to detect, based on the captured image of the front of the own vehicle, lane marking lines of a travelling lane of the own vehicle, wherein:

the threshold value changing means further comprises:

a second threshold value setting means configured to:

set, when the lane marking lines are detected by the lane detection means, the threshold value based on a width of the travelling lane; and set, when the lane marking lines are not detected by the lane detection means, the threshold value based on a width of the own vehicle.

14. The travelled-route selecting apparatus according to claim 6, further comprising:

a lane detection means configured to detect, based on the captured image of the front of the own vehicle, lane marking lines of a travelling lane of the own vehicle, wherein:

the threshold value changing means further comprises:

a second threshold value setting means configured to:

set, when the lane marking lines are detected by the lane detection means, the threshold value based on a width of the travelling lane; and set, when the lane marking lines are not detected by the lane detection means, the threshold value based on a width of the own vehicle.

15. The travelled-route selecting apparatus according to claim 7, further comprising:

a lane detection means configured to detect, based on the captured image of the front of the own vehicle, lane marking lines of a travelling lane of the own vehicle, wherein:

the threshold value changing means further comprises:

a second threshold value setting means configured to:

set, when the lane marking lines are detected by the lane detection means, the threshold value based on a width of the travelling lane; and set, when the lane marking lines are not detected by the lane detection means, the threshold value based on a width of the own vehicle.

16. The travelled-route selecting apparatus according to claim 1, wherein:

the first route selecting means is configured to select the one or more travelled routes each having a longitudinal distance relative to the own vehicle, each of the longitudinal distances of the one or more travelled routes satisfying a first determination condition that the corresponding one of the longitudinal distances being equal to or lower than a second threshold value as the predetermined threshold value; and the second route selecting means is configured to, when the travelled routes are selected by the first route selecting means, select, from the travelled routes selected by the first route selecting means, the travelled route that satisfies a second determination condition that a lateral distance of the travelled route relative to the own vehicle being the shortest in the lateral distances of all the travelled routes relative to the own vehicle.

17. The travelled-route selecting apparatus according to claim 1, further comprising:
an other vehicle selecting means configured to:
obtain an own lane probability for each of the other vehicles detected by the other vehicle detecting means using an own-lane probability map, the own-lane probability map including own-lane probabilities previously defined for respective plural areas, each of the areas has a horizontal orientation and a distance from own vehicle, the own-lane probability for each of the areas representing a probability that each of the other vehicles located on the corresponding area is within a same own lane of the own vehicle; and
select, from the other vehicles, candidate other vehicles in descending order according to the corresponding own-lane probabilities, the number of the selected candidate other vehicles being within a predetermined maximum number, wherein the route generating means is configured to generate the travelled route of each of the candidate other vehicles selected by the other vehicle selecting means.

18. A travelled-route selecting method comprising:
a first step of detecting, using a detection device, other vehicles in front of an own vehicle;
a second step of generating, using a processor, a travelled route of each of the other vehicles detected by the first step;
a third step of selecting, using the processor, from the travelled routes of the other vehicles generated by the second step, one or more travelled routes, the one or more travelled routes each having a relative distance relative to the own vehicle equal to or lower than a predetermined threshold value; and
a fourth step of selecting, using the processor, from the travelled routes selected by the third step, a travelled route corresponding to a selected other vehicle, the selected other vehicle being the closest to the own vehicle among the other vehicles corresponding to the travelled routes selected by the third step.

19. A driving assist system comprising:
the travelled-route selecting apparatus according to claim 1; and
a driving assist apparatus configured to perform driving assist of the own vehicle in accordance with the travelled route selected by the second route selecting means of the travelled-route selecting apparatus.

20. The driving assist system according to claim 19, wherein:
the driving assist apparatus is configured to perform, as the driving assist, at least one of:
full speed range adaptive cruise control; and
lane trace control.

* * * * *